E. CUSENIER, Sr.
COMBINED BOTTLE AND BASKET.
No. 186,311. Patented Jan. 16, 1877.
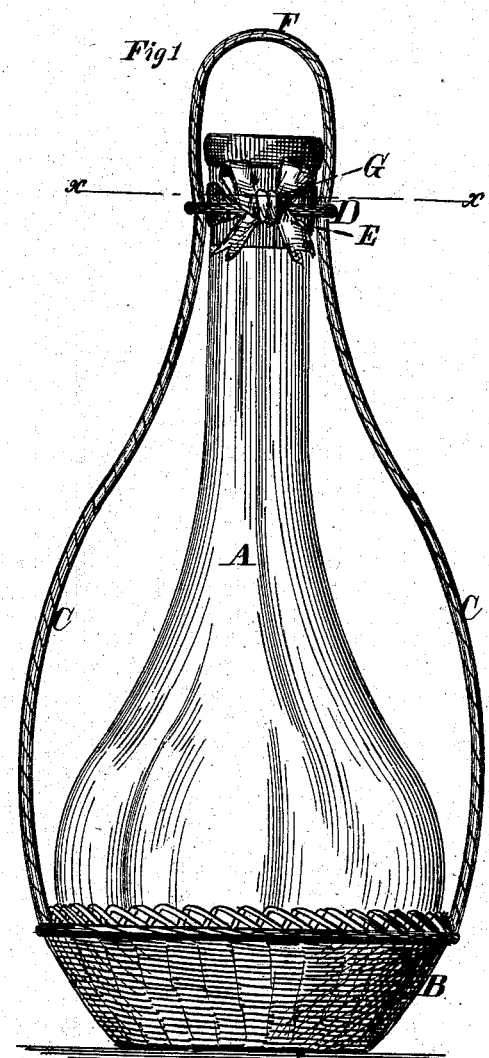
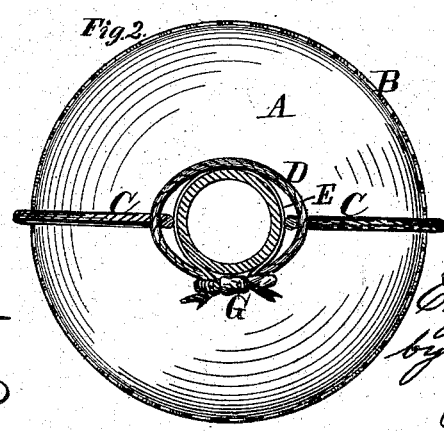

UNITED STATES PATENT OFFICE.

EUGÈNE CUSENIER, SR., OF PARIS, FRANCE.

IMPROVEMENT IN COMBINED BOTTLE AND BASKET.

Specification forming part of Letters Patent No. 186,311, dated January 16, 1877; application filed December 8, 1876.

*To all whom it may concern:*

Be it known that I, EUGÈNE CUSENIER, Sr., of Paris, in the Republic of France, have invented an Improvement in Combined Bottles and Baskets; and I do hereby declare that the following is a full, clear, and exact description of the same, reference being had to the accompanying drawing, which forms a part of this specification.

The invention consists in a combined bottle and basket for wines, spirits, liqueurs, and cordials, said basket being fitted to the bottom of the bottle, and provided with a bail, which passes up along opposite sides of the body and neck and over the mouth of said bottle, and which is attached to the neck of the bottle by a ring, in such manner as to hold both the ring and bail in position. The bail, so attached, forms an elegant and convenient handle for carrying said bottle and basket, and for suspending the same.

In the accompanying drawing, Figure 1 is a side view, and Fig. 2 is a horizontal section, on the line $x\ x$ in Fig. 1, of a combined bottle and basket constructed in accordance with my improvement.

A represents the bottle; B, the basket; C, the bail of the basket; D, the ring, and E a ribbon tied to the ring D and attached to the neck of the bottle A. The bottle A may be of any shape or design. The basket B is fitted to the bottom of the bottle, and may be made of fine osier or other suitable material. The bail C may be made of the same material as the basket, or of other suitable and ornamental material. Said bail is attached to said basket, and passes up on opposite sides of said bottle, as shown in Fig. 1; and it forms a suspending loop or handle, F, Fig. 1, above the mouth of the bottle.

The ring D is slipped over the upper part of the bail C. The ribbon E, or other suitable or ornamental flexible connector, such as a cord or wire, is looped around the neck of the bottle, and tied, knotted, or looped to the ring D, as shown at G, which attachment holds all the parts in relation to each other, as shown.

I claim—

A combined bottle and basket, the basket receiving and supporting the bottom of the bottle, and having attached to it a bail, C, passing up on opposite sides and over the mouth of the bottle, and attached to the neck of the bottle by a ring, D, substantially as and for the purpose specified.

EUGÈNE CUSENIER, Sr.

Witnesses:
J. V. CÉVINN,
FR. WAGNER.